United States Patent Office 3,294,534 Patented Dec. 27, 1966

3,294,534

DIAZOTYPE PHOTOPRINTING MATERIAL SUSCEPTIBLE TO THERMAL DEVELOPMENT

Bernard I. Halperin, Glen Aubrey, N.Y., assignor to General Aniline & Film Corporation, New York, N.Y., a corporation of Delaware No Drawing. Filed July 1, 1963, Ser. No. 292,066
8 Claims. (Cl. 96—49)

This invention relates to light-sensitive diazotype photoprinting material susceptible to development by heating; to a process for preparing such material, and to the process of making photocopies therewith.

Two-component diazotype photoprinting material commonly comprises a supporting sheet having, in a surface layer thereof, an azo coupling component and a stabilized light-sensitive diazonium compound which couple when exposed to an alkaline medium to form an azo dyestuff, the composition being stabilized against premature coupling by inclusion of an acid stabilizer. On exposure of the layer to actinic light under an opaque pattern on a translucent background, the light-sensitive compound is destroyed in the light-struck areas. On subsequent contact of the image-wise exposed material with an alkaline developing medium such as gaseous ammonia, the acid stabilizer is neutralized causing coupling of the residual diazonium compound with the azo coupling component, forming an azo dye image corresponding to the opaque pattern of the original. Use of ammonia for development has the disadvantage of requiring equipment adapted to confine or vent the gaseous ammonia for protection of the operators.

One-component diazotype photoprinting material is provided with a surface layer containing a light-sensitive diazonium compound with the azo coupling component, After exposure to light under an opaque pattern, development is effected by applying an alkaline solution containing an azo coupling component. This process has the disadvantage that the alkaline coupler solutions tend to deteriorate, are inconvenient to handle, and the copies produced have to be dried.

It has been proposed heretofore to prepare the diazotype photoprinting material susceptible to development by heat alone. Thus in United States Patents 2,178,771 and 2,205,991, processses are disclosed in which reagents adapted to yield alkali upon exposure to heat and moisture are applied in dry powdered form to the surface of two-component diazotype materials. After exposure to light under an opaque pattern, development of the image can be effected by exposure of the material to a hot moist atmosphere. United States Patents 2,228,562, 2,681,277, 2,732,299 and 2,774,669, inter alia, disclose two-component diazotype materials including a nitrogen compound, e.g., a urea derivative, which on heating decomposes to form ammonia or a nitrogenous base which causes coupling of the two-component diazotype system. The aforesaid materials have the disadvantage that their alkali-yielding components are relatively unstable, especially when exposed to atmospheric moisture, resulting in poor stability to discoloration in storage. The nitrogen compounds are susceptible to bacterial decomposition, and the decomposition products thus formed, or formed during development, are often objectionably malodorus.

United States Patents 2,691,587 and 2,747,999 disclose processes in which an alkaline producing compound adapted to cause coupling of a stabilized diazonium compound with an azo coupling component is provided in a more or less fusible layer on a supporting surface, while the diazonium compound is provided in a light-sensitive layer on another support. The coupling component may be incorporated in either of the two layers. After exposure of the diazonium sensitized material to actinic light under an opaque pattern, the layers are brought together and heated causing sufficient fusion to permit migration of the alkaline reacting material into the layer containing the diazonium compound so that coupling occurs, yielding an image in one or both layers. This procedure involves the use of two sheets and for this reason is comparatively inconvenient.

United States Patent 2,653,091 discloses two-component diazotype photoprinting material stabilized with trichloroacetic acid. This composition also includes an alkali metal, ammonium or ethanolamine salt of trichloroacetic acid. After image-wise exposure to light, development is effected by heating, whereby the trichloroacetic acid and its salt are decomposed leaving an alkaline residue which causes image-wise coupling of the two-component system. However, the paper base of such materials are subject to deterioration by reason of the strong acid employed as the stabilizer. Moreover, the salts of trichloroacetic acid included in the composition accelerate spontaneous decomposition of the diazonium compound so that the material possesses poor storage qualities.

It is an object of this invention to overcome the aforesaid disadvantage of prior art materials, while providing diazotype photoprinting material susceptible to heat development which is stable under storage conditions and which yields excellent copies when exposed to light under an opaque pattern and developed by heating.

In accordance with this invention, a light-sensitive diazonium salt and a compound adapted, on heating, to liberate an alkali or an alkaline acting material are respectively deposited on a base or support in successively applied layers of an aqueous latex containing, in emulsified form, a film-forming organic polymer, the first latex layer being dried before application of the second. The azo coupling component may be incorporated in either layer, but is preferably included in the layer containing the alkali-generating compound. An acidic stabilizer is included in the layer containing the stabilized diazonium compound.

The latex employed in the formation of the first layer is preferably selected to yield a film which does not become water repellent on drying. In this way, the application of the second aqueous latex layer is facilitated. If the latex employed for the first layer forms a hydrophobic surface on drying, an aqueous wetting agent or a water-miscible organic solvent having wetting or solvent properties for the polymer film is applied before coating with the second aqueous latex composition.

Suitable lattices for the first layer are especially emulsions of polyvinylacetate or vinylacetate copolymers which yield a non-water repellent film on drying. Lattices suitable for the second layer include in addition to aqueous emulsions of polyvinylacetate, aqueous emulsions of polyvinylchloride, polyvinylidine chloride, polyacrylonitrile and polymethylacrylates.

Light-sensitive stabilized diazonium compounds which can be employed in preparing the diazotype sensitized layers according to the invention include those listed in United States Patent 2,501,874 and in the article by Van der Grinten in the Photographic Journal, vol. 92 (B) (1952) page 46. They include especially diazonium compounds derived from N-mono- or N-disubstituted p-phenylenediamine, e.g., the diazotization products of:

N,N-diethyl-p-phenylenediamine
N-benzyl-N-ethyl-p-phenylenediamine
N-ethyl-p-phenylenediamine
N,N-diethyl-2-ethoxy-p-phenylenediamine
N-ethyl-2-methyl-p-phenylenediamine
N,N-bis-hydroxyethyl-p-phenylenediamine
N-beta-hydroxyethyl-N-methyl-p-phenylenediamine These compounds are preferably stabilized in the form of their double salts with zinc chloride, tin chloride, cadmium chloride, and the like.

Azo coupling components which can be included in the materials according to the invention are for example:

2,3-dihydroxynaphthalene
1,8-dihydroxynaphthalene
Phloroglucinol
Resorcinol
Octylresorcinol
Alpha-resorcylamide
3-methyl-1-phenyl-5-pyrazolone
Acetoacetanilide
H-acid
2,3-dihydroxynaphthalene-6-sulfonic acid
2,5-xylenol Acid stabilizers which can be included in the layer containing the diazonium salt include citric acid, tartaric acid, boric acid, acetic acid, and similar acid reacting compounds.

In addition to the foregoing materials, there can also be included in one layer or the other, additives which are commonly employed in diazotype sensitized photoprinting layers. These include, for example, intensifiers such as ammonium sulfate, zinc chloride or nickel sulfate, best included in the diazonium salt layer; stabilizing agents such as thiourea, or thiosinamine, and accelerators such as 1-allyl-3-beta-hydroxyethyl-2-thiourea or 1-allyl-2-thiourea which are best incorporated in the azo coupling layer. Hygroscopic agents such as glycol or glycerin and wetting agents such as saponin, lauryl sulfate, keryl benzene sulfonate or oleyl-N-methyl taurine can be included in one or both layers.

Heat responsive reagents adapted to yield a base for neutralization of the acid stabilizer in the light-sensitive materials of the invention may be selected from compounds having a neutral or acid reaction at room temperature, but which upon application of heat undergo a modification giving rise to an alkaline environment. Compounds of this kind which have been suggested in the prior art can be used in the heat responsive diazotype materials of the invention. These include neutral alkali metal and nitrogen base salts of trichloroacetic acid and of other strong organic acids which are decomposed by heat to yield a basic compound. These include, for example, the alkali metal, and nitrogen base salts of malonic, oxalic and maleic acids, or of benzene sulfonic acids. In addition, there may be mentioned the alkali metal, and nitrogenous base salts of aliphatic monocarboxylic acid or 1 to 3 carbon atoms having negative chain substituents such as halogen, CN or $NO_2$ in alpha or beta position. These compounds are incorporated in the latex layer which does not contain the light-sensitive diazonium compound, preferably in the same layer with the azo coupling component. The nitrogen bases used in the preparation of such salts include ethanolamine, diethanolamine, triethanolamine, tripropylamine, dibutylamine, diisobutylamine, disecbutylamine and similar Lewis type bases which are not appreciably volatile at the temperature of heat development.

When material coated with these layers is exposed under an opaque pattern to actinic light, development of an image corresponding to the pattern is effected by heating at temperatures of about 100 to 200° C. and preferably 120 to 160° C., at which decomposition occurs of the base-generating compound and migration of the alkaline residue thereof to the layers containing the diazonium compound occurs, causing coupling of the residual diazonium compound with the azo coupling component in the unexposed image areas protected by the opaque pattern.

Provision of a coating comprising the two superposed layers in accordance with this invention separates the light-sensitive diazonium compound from the base-generating reagent, and permits, in the preferred form of the invention, the separating of the azo coupling components also from the diazonium compound. As a result, the photoprinting material is stable in storage and can be successfully developed by heating.

Photoprinting material in accordance with the invention has the advantage of requiring no external source of moisture or of gaseous reagents such as ammonia. Since the alkali formed during heating is not fugitive under normal operation, only a small amount is required. This permits use of base-generating reagents which do not produce malodorous by-products during heat development. Background discoloration in the copies is avoided in view of the absence of massive amounts of alkaline reacting components.

The invention is illustrated by the following examples wherein parts and percentages are by weight unless otherwise indicated.

*Example I*

Paper was coated with a solution having the following composition:

| | |
|---|---|
| Water ____cc__ | 60 |
| Citric acid ____gr__ | 0.5 |
| 4-dimethylaminobenzene diazonium chlorozincate ____gr__ | 1.5 |
| Aqueous polyvinylacetate emulsion containing about 50% resin solids having an average particle size of the order of 1 to 5 microns ____cc__ | 10 |
| Colloidal silica ____gr__ | 4.0 |
| Water to 100 cc. | |

After drying, a second coating was applied having the following composition:

| | |
|---|---|
| Water ____cc__ | 60 |
| 2,3-dihydroxynaphthalene-6-sodium sulfonate __gr__ | 4.0 |
| Sodium trichloroacetate ____gr__ | 2.5 |
| Aqueous emulsion of polyvinylacetate containing 50% resin solids with average particle size of about 0.3 to 1 micron ____cc__ | 25 |
| Water to 100 cc. | |

After drying, the resulting light-sensitive material was exposed to actinic light under an original having an opaque pattern on a translucent background in the customary manner for diazotype photoprinting. Development was then effected by heating the sheet to a temperature of 120 to 160° C., e.g., by contact with a heated roller maintained at a temperature of about 175° C. A blue image corresponding to the opaque pattern of the original was formed, having good intensity. No background discoloration was observed.

Similar results were obtained by substituting, for the polyvinyl acetate emulsion of the first coating in the foregoing example, a corresponding amount of the emulsion of the second coating and substituting the emulsion of the first coating of Example I for the emulsion used in the second coating.

Similar results were also obtained on substituting for the polyvinylacetate emulsion of the second coating, a similar quantity of an aqueous polyvinylidene chloride latex containing about 50% resin solids and having an average particle size of 1 to 5 microns.

*Example II*

Paper was coated in the manner described in Example I with the following composition:

| | |
|---|---|
| Water ____cc__ | 60 |
| Citric acid ____gr__ | 0.5 |
| p-N-ethyl-N-beta-hydroxyethylamino-benzenediazoniumchlorozincate ____gr__ | 2.5 |
| Aqueous polyvinylacetate emulsion employed in the first coating of Example I ____cc__ | 10 |
| Colloidal silica ____gr__ | 4.0 |
| Water to 100 cc. | |

After drying, a second coating was applied having the following composition:

| | | |
|---|---|---|
| Water | cc | 60 |
| 4,4'-thiodiresorcinol | gr | 4 |
| 2,3-dihydroxynaphthalene-6-sodium sulfonate | gr | 2 |
| Sodium trichloroacetate | gr | 2.5 |
| Aqueous polyacrylonitrile latex containing about 50% resin solids | cc | 25 |
| Water to 100 cc. | | |

Upon exposure to light under a pattern and heat development as in Example I, a black image of the original pattern was produced.

Similar results are obtained in the foregoing examples on substituting stoichiometrically equivalent amounts of potassium trichloroacetate or of ammonium trichloroacetate for the sodium trichloroacetate employed in the examples.

In the foregoing examples, the layer containing the azo coupler and base-generating reagent is superposed on the layer containing the diazonium compound Satisfactory results are also obtained by reversing the two layers so that the surface layer contains the diazonium compound and the underlying layer contains the azo coupling component and base-generating reagent. Alternatively, the azo coupling component can be incorporated in the diazonium compound containing layer instead of in the layer containing the base-generating reagent, a suitable acid stabilizer such as citric or tartaric acid being included to prevent premature coupling. For most purposes, however, it is preferred to utilize the added stability resulting from separation of the azo coupling component and diazonium compound in two layers, rather than to combine them in a single layer.

Variations which will be obvious to those skilled in the art can be made in the foregoing processes and materials without departing from the scope or spirit of the invention.

I claim:

1. Light-sensitive diazotype photoprinting material having on one surface of a supporting sheet, two superposed dried coatings of an aqueous latex dispersion of a synthetic organic film-forming polymer, one of said coatings containing a light-sensitive diazonium compound and an acid stabilizer therefore, and the other containing an acid to neutral compound selected from the group consisting of the alkali metal and nitrogen base salts of organic acids, which is converted on heating to temperatures from 100 to 200° C. to an alkaline compound which is substantially non-volatile at the conversion temperature, and an azo coupling component in at least one of said coatings.

2. Light-sensitive diazotype photoprinting material as defined in claim 1 wherein said acid to neutral compound a salt is of trichloroacetic acid.

3. Light-sensitive diazotype photoprinting material as defined in claim 1 wherein the polymer of the first coating is polyvinyl acetate.

4. Light-sensitive diazotype photoprinting material as defined in claim 3 wherein the polymers of both coatings are polyvinyl acetate.

5. Light-sensitive diazotype photoprinting material as defined in claim 1 wherein the light-sensitive diazotype compound and its acid stabilizer are contained in one of said coatings and the azo coupling component together with said acid to neutral compound and contained in the other of said coatings.

6. Light-sensitive diazotype photoprinting material as defined in claim 5 wherein the diazonium compound and stabilizer are contained in the inner of said coatings.

7. A process for making diazotype photocopies which comprises exposing the light-sensitive diazotype photoprinting material as defined in claim 1 to actinic light under a relatively opaque pattern carried on a relatively translucent background until substantial decomposition of the light-sensitive diazonium compound occurs in the light-struck areas, and heating resulting sheet at a temperature of 100 to 200° C to effect development.

8. A process as defined in claim 7 wherein the development temperature is 120 to 160° C.

References Cited by the Examiner

UNITED STATES PATENTS 2,653,091 9/1953 Grieg ---------- 96—49

FOREIGN PATENTS 1,249,913 11/1960 France.
1,255,950 2/1961 France.
815,005 6/1959 Great Britain.

OTHER REFERENCES

Kosar: "Photographic Science and Engineering," vol. 5, No. 4, July-August, 1961, pp. 239–243.

NORMAN G. TORCHIN, *Primary Examiner.*

R. L. STONE, *Examiner.*

ALEXANDER D. RICCI, *Assistant Examiner.*